US008816689B2

(12) United States Patent
Colombo et al.

(10) Patent No.: US 8,816,689 B2
(45) Date of Patent: Aug. 26, 2014

(54) APPARATUS AND METHOD FOR MULTI-COMPONENT WELLBORE ELECTRIC FIELD MEASUREMENTS USING CAPACITIVE SENSORS

(75) Inventors: Daniele Colombo, Dhahran (SA);
Timothy H. Keho, Dhahran (SA);
Michael Anthony Jervis, Dhahran (SA);
Brett W. Bouldin, Dhahran (SA)

(73) Assignee: Saudi Arabian Oil Company, Dhahran (SA)

( * ) Notice: Subject to any disclaimer, the term of this patent is extended or adjusted under 35 U.S.C. 154(b) by 483 days.

(21) Appl. No.: 13/109,733

(22) Filed: May 17, 2011

(65) Prior Publication Data

US 2012/0293179 A1    Nov. 22, 2012

(51) Int. Cl.
*G01V 3/10* (2006.01)
*G01V 3/18* (2006.01)
*G01V 3/28* (2006.01)
*E21B 47/00* (2012.01)

(52) U.S. Cl.
CPC .. *G01V 3/10* (2013.01); *G01V 3/18* (2013.01); *G01V 3/28* (2013.01); *E21B 47/00* (2013.01)
USPC ........... 324/339; 324/328; 324/335; 324/336; 324/337; 324/338; 324/347; 324/372; 324/332; 324/333; 324/334; 324/366; 324/370; 702/6; 702/7

(58) Field of Classification Search
CPC ............. G01V 3/18; G01V 3/28; E21B 47/00
USPC ........ 324/328, 329, 335, 336, 337, 338, 347, 324/372, 332, 333, 334, 339, 366–370; 702/6, 7
See application file for complete search history.

(56) References Cited

U.S. PATENT DOCUMENTS

| 2,991,411 A | 7/1961 | Freedman |
| 3,808,520 A | 4/1974 | Runge |

(Continued)

FOREIGN PATENT DOCUMENTS

| EP | 0324292 A1 | 7/1989 |
| GB | 2423370 A | 8/2006 |

(Continued)

OTHER PUBLICATIONS

J Macnae, "Near-Surface Resistivity Contrast Mapping With a Capacitive Sensor Array and an Inductive Source," Geophysics Society of Exploration, vol. 76, No. 2, pp. G13-G23, XP001574293, Mar. 1, 2011.

(Continued)

*Primary Examiner* — Patrick Assouad
*Assistant Examiner* — Lamarr Brown
(74) *Attorney, Agent, or Firm* — Bracewell & Giuliani LLP; Constance G. Rhebergen; Denver S. Bisignano

(57) ABSTRACT

A method and apparatus is provided for collecting reservoir data. The method includes providing one or more electromagnetic sources for generating an electromagnetic field in a reservoir and providing one or more electromagnetic sensors equipped with capacitive electrodes. The electromagnetic source is located separately from the electromagnetic sensor. The electromagnetic sensor may either be located within a well or at the surface, is capable of measuring the electromagnetic field in three dimensions, and may be isolated from the well fluids. The data collected by the electromagnetic sensors can be used to create a model of the oil reservoir, including the water saturation.

43 Claims, 3 Drawing Sheets

(56) References Cited

U.S. PATENT DOCUMENTS

| | | | | |
|---|---|---|---|---|
| 4,884,071 A * | 11/1989 | Howard | | 340/854.8 |
| 4,914,433 A * | 4/1990 | Galle | | 340/854.4 |
| 5,101,163 A | 3/1992 | Agar | | |
| 5,209,112 A * | 5/1993 | McCoy et al. | | 73/170.01 |
| 6,084,052 A * | 7/2000 | Aufdermarsh et al. | | 528/125 |
| 6,373,253 B1 | 4/2002 | Lee | | |
| 6,489,772 B1 | 12/2002 | Holladay et al. | | |
| 6,808,956 B2 * | 10/2004 | Cabuz et al. | | 438/52 |
| 6,809,521 B2 | 10/2004 | Tabarovsky et al. | | |
| 7,183,777 B2 | 2/2007 | Bristow et al. | | |
| 7,492,168 B2 | 2/2009 | Ogilvy et al. | | |
| 7,578,189 B1 * | 8/2009 | Mehregany | | 73/514.18 |
| 7,852,087 B2 | 12/2010 | Wilt et al. | | |
| 2002/0030492 A1 * | 3/2002 | Guo et al. | | 324/334 |
| 2002/0074129 A1 * | 6/2002 | Moore | | 166/375 |
| 2002/0114218 A1 * | 8/2002 | Lee et al. | | 367/140 |
| 2003/0052685 A1 * | 3/2003 | Ellingsrud et al. | | 324/337 |
| 2003/0055565 A1 * | 3/2003 | Omeragic | | 702/7 |
| 2004/0117119 A1 * | 6/2004 | West et al. | | 702/6 |
| 2004/0119471 A1 * | 6/2004 | Blanz et al. | | 324/303 |
| 2004/0141420 A1 * | 7/2004 | Hardage et al. | | 367/149 |
| 2005/0267686 A1 * | 12/2005 | Ward | | 702/6 |
| 2006/0038570 A1 * | 2/2006 | Constable | | 324/334 |
| 2006/0238200 A1 * | 10/2006 | Johnstad | | 324/337 |
| 2006/0255809 A1 * | 11/2006 | Johnstad et al. | | 324/337 |
| 2007/0068673 A1 * | 3/2007 | Daily | | 166/254.2 |
| 2007/0230268 A1 * | 10/2007 | Hoogeveen et al. | | 367/19 |
| 2008/0128138 A1 * | 6/2008 | Radi | | 166/350 |
| 2008/0303526 A1 * | 12/2008 | Itskovich et al. | | 324/367 |
| 2009/0039889 A1 | 2/2009 | Wilt | | |
| 2009/0105955 A1 | 4/2009 | Castillo et al. | | |
| 2009/0237082 A1 * | 9/2009 | Samworth | | 324/333 |
| 2010/0141261 A1 * | 6/2010 | Overby et al. | | 324/329 |
| 2010/0214094 A1 * | 8/2010 | Givens et al. | | 340/539.17 |
| 2010/0219334 A1 * | 9/2010 | Legrand et al. | | 250/256 |
| 2010/0256913 A1 * | 10/2010 | Kuckes | | 702/6 |
| 2010/0259267 A1 * | 10/2010 | Rosthal et al. | | 324/339 |
| 2012/0139530 A1 * | 6/2012 | McElhinney et al. | | 324/207.13 |
| 2012/0146805 A1 * | 6/2012 | Vick et al. | | 340/853.2 |
| 2012/0175135 A1 * | 7/2012 | Dyer et al. | | 166/387 |
| 2012/0187965 A1 * | 7/2012 | Roziere | | 324/688 |
| 2012/0198927 A1 * | 8/2012 | Maute et al. | | 73/152.29 |

FOREIGN PATENT DOCUMENTS

| | | |
|---|---|---|
| WO | WO2007055784 A2 | 5/2007 |
| WO | WO2007129897 A1 | 11/2007 |

OTHER PUBLICATIONS

International Search Report and Written Opinion for Related PCT Application PCT/US2012/037886, dated Nov. 5, 2012.

Shima et al., "Developments of non-contact data acquisition techniques in electrical and electromagnetic explorations", Journal of Applied Geophysics 35 (1996) pp. 167-173, Elsevier.

Dashevsky et al., "Capacitance Sounding: a New Geophysical Method for Asphalt Pavement Quality Evaluation", Barn, Internal Symposium (NDT-CE 2003), Non-Destructive Testing in Civil Engineering 2003, DGZfP.

"Borehole Surveys", Aurora Geosciences, www.aurorageosciences.com, 3 pgs.

* cited by examiner

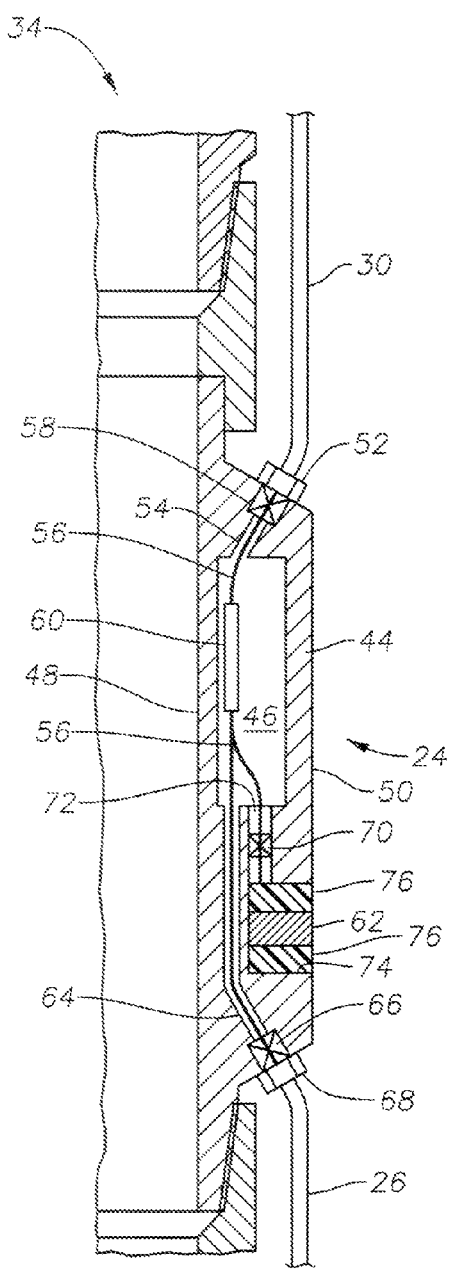
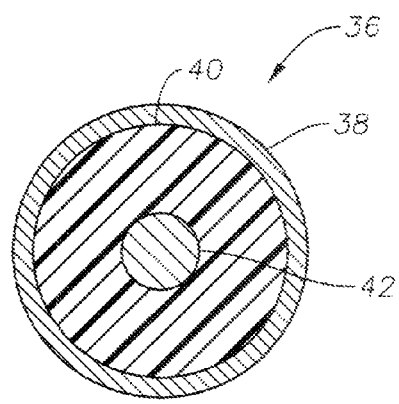
Fig. 2
Fig. 3

APPARATUS AND METHOD FOR MULTI-COMPONENT WELLBORE ELECTRIC FIELD MEASUREMENTS USING CAPACITIVE SENSORS

BACKGROUND OF THE INVENTION

1. Field of the Invention

The present invention relates to an apparatus and method for evaluating oil and gas reservoir characteristics. More specifically, the invention relates to tri-axial field sensors for low frequency electromagnetic fields.

2. Description of the Related Art

Various segments of the energy industry have a need for remote sensing technology to complete such tasks as evaluating oil reserves depletion, optimizing oil recovery, and monitoring underground water, gas and CO2 injection and storage.

It is well known that the ability to measure in a reliable way the electric field components in a borehole environment is of great value to implement electromagnetic-based characterization and monitoring techniques for reservoir fluids. It is also well known that permanent installation of such sensors would enable the optimization of oil field production. Current electric field sensors are very sensitive to environmental conditions such as the chemical composition of borehole fluids, the borehole temperature and pressure conditions, and fluid type, and require careful maintenance and therefore are not reliable. Without solving these problems the development of effective electromagnetic instrumentation for reservoir applications will be limited to the wireline devices based on electromagnetic induction (magnetic coils) and commercialized by major oil field service companies. These magnetic receivers based on electromagnetic induction measurements however are not optimal for measuring electric fields responses in three dimensions and at low frequency.

Current practice for looking at fluid saturation around and at a distance of several hundred meters from the borehole, relies on electromagnetic techniques using magnetometers (i.e. magnetic coils) as sensors. These devices are designed to detect and measure the induced magnetic field generated by an electromagnetic source operating in the frequency or in the time domain. This technology is typically measuring one or three components of the magnetic field.

The present state of the art therefore does not provide for three component electric field measurements to be made in a borehole environment at low frequency. U.S. Pat. No. 6,373,253, for example, discloses measuring the electromagnetic components in a borehole using a toroidal antenna in the frequency range of 1 MHz to 100 MHz. This method derives the electric field components by using an inductive method as opposed to a capacitive method and has a very high range of frequency. Where measurements are made without contact via induction, such as the method that is disclosed in U.S. Pat. No. 6,489,772, there are limitations on the sensor size and dimensions that restrict their use to single (vertical) component magnetic field, measurements.

The advantages of capacitive electric field sensors are that they do not need to directly contact the formation and that they can be made compact enough to measure all three components of the electric field even in a borehole environment. Capacitive measurements have been made in a borehole environment to measure the wellbore resistivity after injecting current into the formation as is disclosed in U.S. Pat. No. 6,809,521, but these are in a logging tool configuration and limited to a small zone in the vicinity of the borehole. The frequencies used in this technology are also high and in the range of 1 kHz to 10 kHz.

The industry is currently lacking borehole electric field sensor technology because of the difficulty of providing low contact resistance and stable conditions for the electric field sensors in the borehole. Current electric field sensors are also very sensitive to environmental conditions such as the borehole conditions and fluid type, require careful maintenance and therefore are not reliable. Otherwise, capacitive electrodes for boreholes are designed for high frequency ranges, such as greater than 1 kHz, and are used as logging tools to look in a small zone in the vicinity of the borehole. For these type of devices, the source is located with, or at most a short distance from, the receiver. The detection of the extremely small variations of the electromagnetic field that are induced by oil being replaced by injection water would benefit from the measurement of all of the three components of the electromagnetic field, which would include measuring the electric field and the magnetic field along three orthogonal directions.

Without solving these problems the development of effective remote sensing electromagnetic instrumentation for reservoir applications will be limited to the wireline devices based on electromagnetic induction (magnetic coils) and commercialized by major oil field service companies.

SUMMARY OF THE INVENTION

The invention of the current application pertains to the field of electromagnetic measurements in reservoirs for characterization and fluid monitoring such as for oil, water, gas. Currently a comprehensive approach to reservoir monitoring with electromagnetic sensing technology deployed at reservoir level in a permanent fashion has yet to be developed. The introduction of reliable and low frequency electric field sensors would enable the expansion of electromagnetic applications to three dimensions and to the region around the boreholes. The problem of obtaining tri-axial electric field measurements in the borehole and for low frequency is solved by the use of capacitive electrode technology coupled with existing miniaturized magnetic field sensors.

Technical limitations have prevented so far the development of reliable electric-field sensors able to be deployed permanently in the reservoir in vertical, deviated and horizontal wells. Some of these limitations are related to the inability to measure the electric field in multi-components under borehole conditions. Device dimensions and the need of providing an effective low contact resistance with the rock formations have prevented the development of reliable borehole electric field measurement devices.

Reservoir fluids present variable conductivity properties and respond differently to electromagnetic excitations provided by an electromagnetic source that can be located several tens, hundreds or thousands of meters away from the receivers. There is a large contrast in electrical properties between brine, a conductive fluid, and gas or oil which are resistive fluids. In fact, petrophysical calculations based on the typical reservoir parameters show that the change in the resistivity as a result of a change in brine saturation can be as much as one order of magnitude or more. The electric field components are most sensitive to variations of the conductivity distribution and are the primary source of geophysical information needed to characterize fluid types and to monitor their evolution over time. Placement of multi-component electric field sensors in the reservoir or above and below it, or in some combination of those positions, allows the monitoring and management of the oil production in addition to monitor the sweep efficiency during water flooding.

The ability to measure the low frequency electric field in a tri-axial arrangement in the borehole would add much more sensitivity to the fluid composition in the reservoir and to the changes in the composition over time, as compared to the single vertical component being measured by the prior art. This can be achieved in a reliable way by using capacitive electrodes because they are insensitive to the local environment and humidity and can be isolated from the fluids within the wellbore. In fact, the electrical transduction from the fluid to the sensing plates is entirely electromagnetic; it does not rely upon a chemical reaction, such as ionic exchange, between the electrode and the fluid, and so there is no dependence on the chemical environment of the fluid.

Capacitive electric field sensors operate in free-space, without electrical contact to any object. This technology allows components of the electric-field to, be measured in three dimensions within the bore hole, either static or moving slowly. The technology has no moving parts and is low power. In addition, because it does not couple to the formation via a chemical reaction the measurement is much more reliable and does not depend on the local environmental conditions, such as pressure, temperature and chemistry. The capacitive electrode technology can be also used in extremely dry ground typical of desert environments. This has the advantage of not requiring electrolyte, such as what is used in a conventional porous pot electrode, to operate, and so can be deployed permanently at the reservoir level without need of maintenance.

Because capacitive electrodes are smaller than the sensors used in current technology, they allow for measurement of the tri-axial electric field in the limited space of a borehole. Moreover, as discussed above, because they are isolated from the wellbore fluids, the tri-axial capacitive electrodes can be arranged and positioned permanently in the reservoir or deployed and retrieved at a later date. As is further described herein, in one embodiment of the current application, all three components of the electric field can be measured without inducing a local current in the formation, but by instead measuring electric fields induced by a more distant source of electric current at the surface, in the same borehole, or in another borehole. This has the effect of extending the depth of investigation from several 10's to 100's of centimeters to 10's or 100's of meters, or even up to a number of kilometers.

In one embodiment of the current invention, a method for collecting reservoir data comprises providing at least one electromagnetic sensor equipped with capacitive electrodes and positioning at least one electromagnetic field source separately from the electromagnetic sensor. An electromagnetic field is then generated in the reservoir with the electromagnetic source and measured with the electromagnetic sensor to collect measured data. A model of the reservoir may be generated with the measured data.

The electromagnetic sensors of the method of this invention may measure the electromagnetic field in three dimensions. This would comprise measuring both the electric and magnetic fields in three dimension. A three dimensional model may be generated. The electromagnetic sensor may be connected to a well casing or production tubing of a subterranean well or may be affixed to an interior surface of the well, known as the wellbore.

The electromagnetic sensor may be positioned in a subterranean well with a wireline and may be removed from the well with a wireline. Alternatively, the electromagnetic sensor may be positioned in a subterranean well with a tubing string. The electromagnetic sensor may be positioned in the subterranean well free from contact with an interior surface of the well. In one embodiment, the electromagnetic field source is located at the surface. In an alternative embodiment, the electromagnetic field source is located in another well. In another alternative embodiment, the electromagnetic sensor may be positioned at the surface and the electromagnetic source may be positioned within a subterranean well. In another embodiment, the electromagnetic sensor may be positioned in a well and the electromagnetic source may be positioned in the same well. In each case, the electromagnetic sensor and electromagnetic source may be a distance of a few meters to several meters or kilometers from the electromagnetic sensor and in one embodiment the electromagnetic sensor is at least 1 meter from the electromagnetic source.

In one embodiment of the current method or apparatus, the electromagnetic source operates at a frequency in the range of 0.1 Hz to 1000 Hz. The reservoir may be an oil reservoir, gas reservoir or water reservoir. The electromagnetic sensor may be capable of collecting both frequency and time-domain electromagnetic field data.

In yet another embodiment of the current invention, a method for collecting reservoir data comprises positioning at least one electromagnetic sensor in a subterranean well and positioning at least one electromagnetic field source at a location separate from the electromagnetic sensor. An electromagnetic field is generated in the reservoir by the electromagnetic source.

In a further system embodiment, the electromagnetic sensor is free from contact with the interior surface of the well. The electromagnetic sensor may be capable of collecting data in three dimensions for frequencies in the range of 0.1 Hz to 1000 Hz and in some embodiments, from 0.1 Hz to 10 Hz. The electromagnetic sensor may also be capable of collecting both frequency and time-domain electromagnetic field data.

In an alternative embodiment of the current invention, an apparatus for collecting reservoir data comprises at least one source for generating an electromagnetic field in the reservoir and at least one electromagnetic sensor equipped with capacitive electrodes. The electromagnetic source is located separately from the electromagnetic sensor, such as at a remote location. The electromagnetic sensor may be located within a subterranean well and may be free from contact with an interior surface of the well. The electromagnetic source may be located at the surface or in a separate subterranean well, or in the same well as the well as the electromagnetic sensor. A source located at the surface may be located at the surface of the earth, at the top surface of a body of water, at the bottom surface of a body of water, or positioned within a body of water below the air water interface but above the bottom of the body of water. In one embodiment, the electromagnetic source is located at least 1 meter from the electromagnetic sensor.

In an alternative embodiment, the electromagnetic sensor is located at the surface and at least one electromagnetic source is located within a subterranean well. The electromagnetic sensors may comprises a plurality of sensors arranged in an array.

The electromagnetic sensor may be capable of collecting data in one to three dimensions. The electromagnetic sensor is affixed to well casing or to production tubing, or may be affixed to an interior surface of the well, known as the wellbore. The electromagnetic sensor may alternatively be part of a downhole tool. The downhole tool may be wireline conveyed and wireline retrievable or may be tubing conveyed. Alternatively, the electromagnetic source may be part of a downhole tool.

BRIEF DESCRIPTION OF THE DRAWINGS

So that the manner in which the above-recited features, aspects and advantages of the invention, as well as others that will become apparent, are attained and can be understood in detail, a more particular description of the invention briefly summarized above may be had by reference to the embodiments thereof that are illustrated in the drawings that form a part of this specification. It is to be noted, however, that the appended drawings illustrate only preferred embodiments of the invention and are, therefore, not to be considered limiting of the invention's scope, for the invention may admit to other equally effective embodiments.

FIG. 2 is an a sectional view of a downhole tool with an electromagnetic sensor used in the system of this invention.

FIG. 3 is an a cross sectional view of a tubing encased conductor used in the system of this invention;

DETAILED DESCRIPTION OF THE EXEMPLARY EMBODIMENTS

Figure 1:
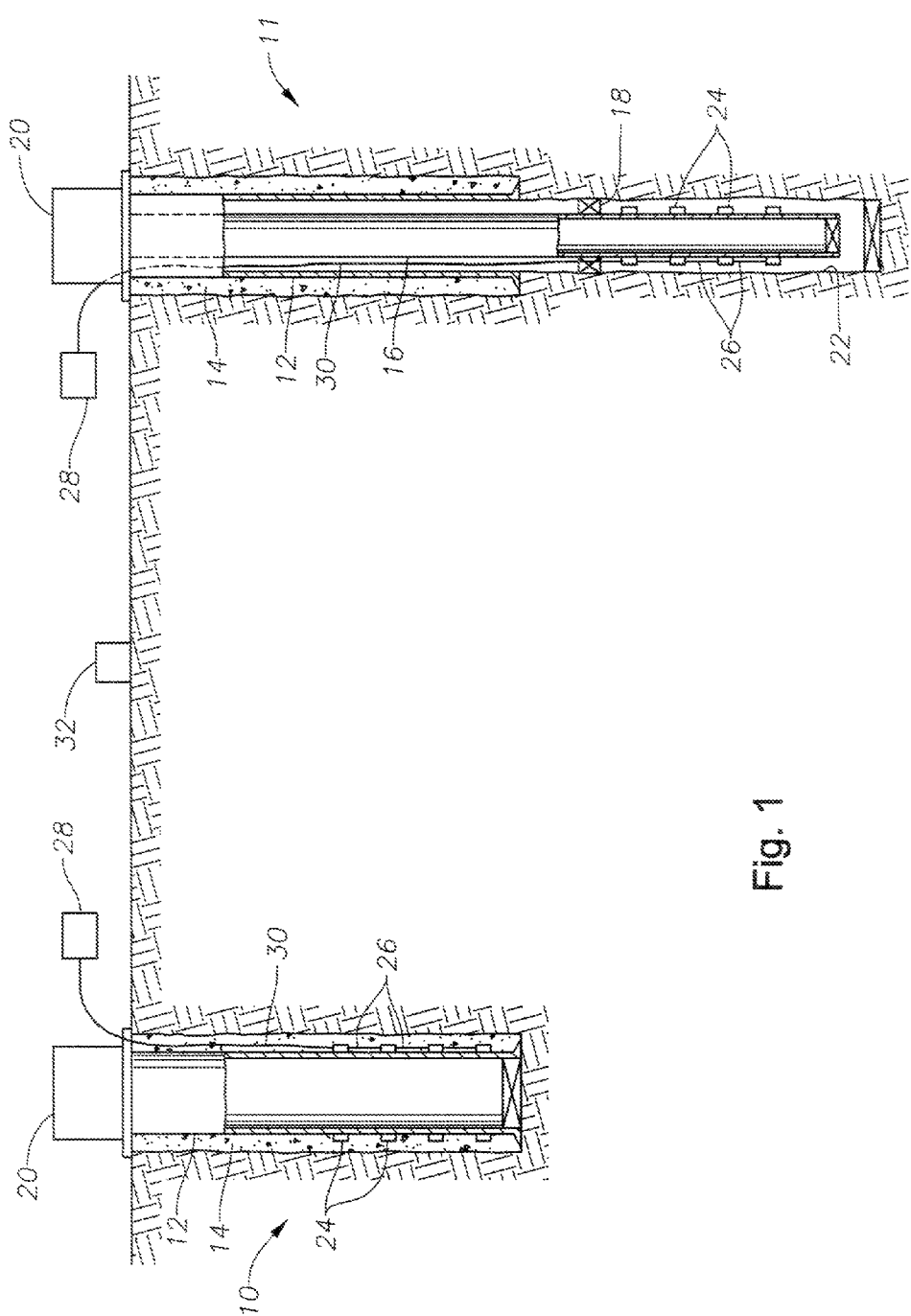
FIG. 1 is a sectional view of a measurements system constructed in accordance with this invention.

As seen in FIG. 1, the system of the current invention may be employed in multiple subterranean wells. One well 10 may be cased with casing 12. Cement 14 surrounds casing 12 and both the casing and cement extend to the bottom of the well. Another well 11 may also be cased with casing 12, which is surrounded by cement 14, but does not extend to the bottom of the well. Well 11 may additionally have production tubing 16 that extends downward into a open portion 22 of the well, below the bottom of the casing 12 and cement 14. Packer 18 seals in the tubing 16 within well 11. Each of wells 10, 11 will have a well head 20. The wells may have vertical, deviated or horizontal boreholes.

In the embodiment of FIG. 1, electromagnetic sensor units 24 are positioned within both well 10 and well 11. In alternative embodiments, the sensor units 24 may be in one well or more than two wells. The sensor units 24 are connected to each other by an electrical umbilical segment 26 and the upper most sensor unit is connected to a power supply and electronic communications module 28 by way of a main umbilical 30. As shown in the embodiment of FIG. 1, multiple sensor units 24 may be positioned in each well. These sensor units 24 may be positioned above, below or at the level of the reservoir, or any combination of those positions. Sensor unit 24 has no moving parts and only requires low power.

In the embodiment of FIG. 1, a source of an electromagnetic field 32, is located at the surface. A single source 32 may generate a sufficient electromagnetic field for multiple wells. Alternatively, multiple sources 32 may be positioned around each well. Source 32 is located separately from sensor unit 24 and may be, for example, a number of meters distance from sensor unit 24 or even many kilometers away from sensor unit 24. Either an alternating current or direct current source may be used. In alternative embodiments, the source 32 may be located in a well adjacent to the well with the sensor units 24 or located in the same well at a finite distance, such as a number of meters, from the sensor units 24.

The combination of the source 32 and sensor units 24 are capable of measuring and reporting information in three dimensions. These measurements may include the vertical and the horizontal components of the electrical field and the magnetic field. Both frequency and time-domain electromagnetic measurements may be obtained. The frequencies detected by the sensor units 24 may be in the range of 0.1 Hz to 1000 Hz. The measurements and data collected by the sensor units 24 may provide information relating to the area around the sensor units 24 at a significant distance, such as tens or several hundred meters up to a number of kilometers away.

Turning now to FIG. 2, a downhole tool 34 houses sensor unit 24. Sensor unit comprises an elongated body 44 with an internal cavity 46. The elongated body 44 may have a curved inner surface 48 and a curved outer surface 50 in order to fit within the inner diameter of a well. Sensor unit 24 communicates with an electronic communications module 28 (FIG. 1) by way of umbilical 30. Umbilical 30 may be, for example a electrical umbilical and may be a tubing encased conductor 36, such as that shown in FIG. 3. As shown in FIG. 3, a tubing encased conductor 36 comprises a tube 38, which surrounds a layer of insulation 40. A conductor 42 is located within insulation 40.

Returning now to FIG. 2, umbilical 30 attaches to sensor unit 42 at upper termination nut 52. Upper termination nut 52 is located near the upper end of sensor unit 24 on an upward facing top surface of sensor unit 24. A conductor 56 exits the umbilical 30 at termination nut 52 an enters cavity 46 by way of an upper passage 54 and is communicatively associated with both a printed circuit board electronics module 60 and electromagnetic sensor 62 before passing through a lower passage 64 and connecting to umbilical 26 at lower termination nut 68. Umbilical 26 may also be a tubing encased conductor 36 (FIG. 3).

As can be seen in the embodiment of FIG. 2, below upper termination nut 52, an upper bulkhead connector pressure barrier 58 seals upper passage 54 from the pressure of the downhole environment. Above lower termination nut 68, a lower bulkhead connector pressure barrier 66 seals lower passage 64 from the pressure of the downhole environment. An intermediate bulkhead connector pressure barrier 70 seals an intermediate passage 72 from the pressure of the downhole environment. The upper passage 54, lower passage 64 and intermediate passage 72 are the only openings to internal cavity 46. The combination of barriers 58, 66 and 70 effectively seal internal cavity 46 from the high pressures of the downhole environment, allowing the internal cavity 46 to be maintained at atmospheric pressure to protect the [PCB] electronics module 60 an any other electronic components housed within internal cavity 46 from excessive pressures.

Outside of internal cavity 46 in a recess 74 formed in the outer side 50 of sensor unit 24. At least one electromagnetic sensor 62 is located within recess 74. Insulators 76 are located above and below sensor 62 within recess 74. Electromagnetic sensor 62 is a low-frequency tri-axial capacitive electrode sensor, capable of collecting and reporting the electrical fields in 3 dimensions, the magnetic field in 3 dimensions, and the change in magnetic field in three dimensions over time. Electromagnetic sensor 62 may collect both frequency and time-domain electromagnetic field data. The ability of electromagnetic sensor 62 does not depend on the chemical environment surrounding the sensor 62 or on the local wellbore temperature or humidity. Sensor 62 is capable of operating in dry conditions without electrolyte, such as that used in a conventional porous pot electrode, to operate, and so can be deployed permanently at the surface or at the reservoir level without need, of significant routine maintenance. Electromagnetic sensor 62 may either be in contact with the formation (reservoir) or completely isolated from the interior surface of the wellbore.

Returning to FIG. 1, in operation in the embodiment of well 10, the sensor units 24 may be affixed to casing 12 and therefore be permanently installed in the well when casing 12 is run into the well. For the embodiment of well 11, the sensor units 24 may be affixed to production tubing 16 and installed when tubing 16 is run into the well. If tubing 16 is removed, the sensor units 24 will also be removed from the well. Otherwise, sensor units 24 affixed to tubing 16 remain in the well. In an alternative embodiment, sensor unit 24 may be affixed to the wellbore. Alternatively, for either well 10 or well 11, tool 34 may be lowered into the well on a wireline or other conventional means for placing downhole tools, such as a wireline tool, in a well. In this embodiment, the tool 34 with sensor units 24 may be retrieved or moved within the wellbore as needed for routine maintenance and repair, replacement, or the repositioning of the sensors due to changing formation conditions or as otherwise required or desired.

After the sensor units 24 are secured in the well, source 32 generates an electromagnetic field that permeates the ground, including the areas in the vicinity of the reservoir such as the areas above, below, and within the reservoir, and reaches the sensors 62. The source 32 may generate a signal on an ongoing basis, or intermittently, such as a number of times an hour, day or week. Alternatively the 32 may generate a signal only when an operator chooses to gather data. The change in resistivity induced by water-oil substitution, such as that due to the water flooding process produces, causes changes in the electromagnetic fields that are detectable by the sensors 62 located in, or close to, the reservoir. Measurement of the triaxial electrical and magnetic fields can record, report and reveal these changes. From this information, a model of the reservoir, including the water saturation, may be generated. This model may be three dimensional and can be further refined by considering the electrical anisotropy of the overburden, the overburden being the material that lies between the formation and the earth's surface.

Figure 4:
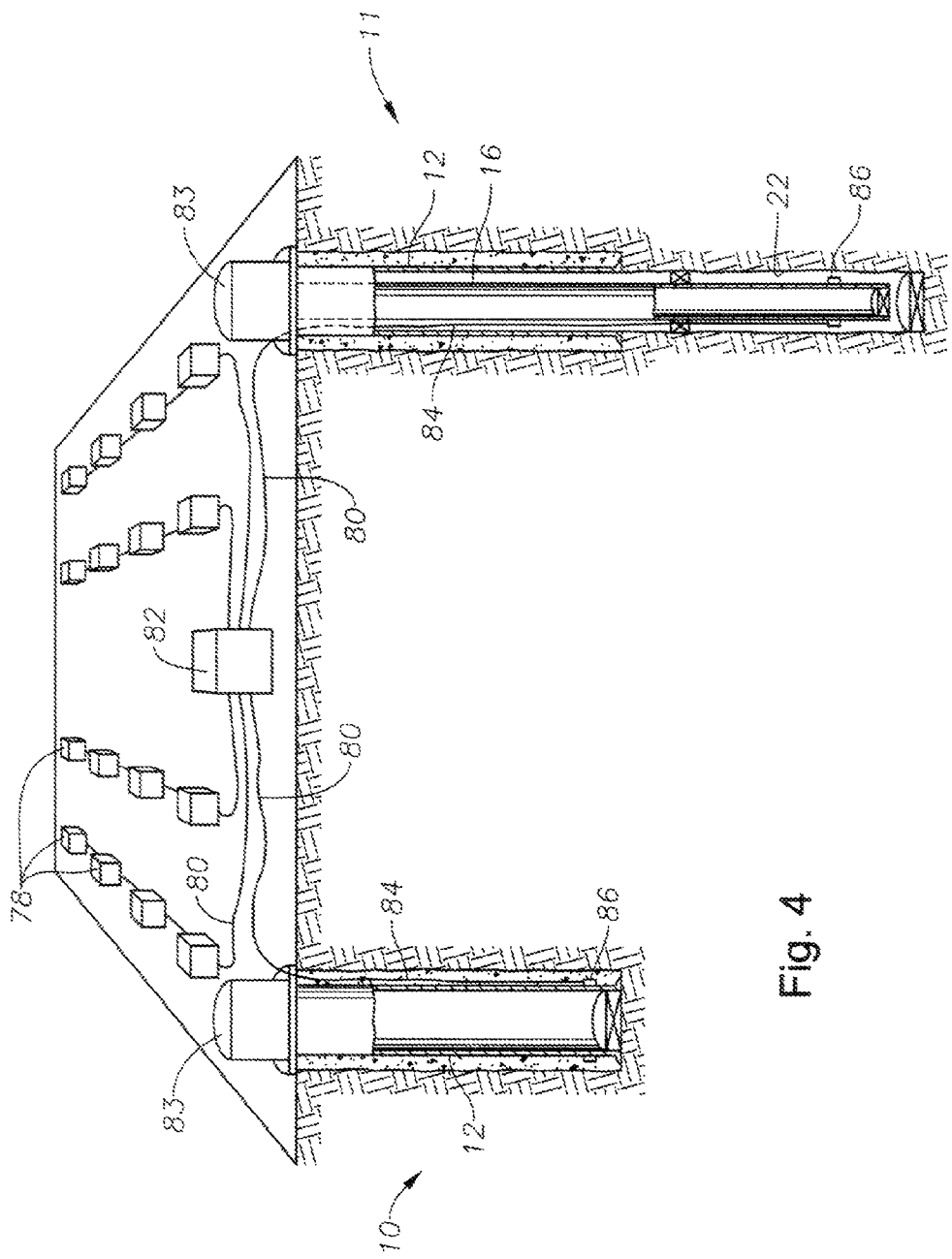
FIG. 4 is an a sectional view of an alternative embodiment of a measurements system constructed in accordance with this invention.

An alternative embodiment is illustrated in FIG. 4. In this embodiment, the electromagnetic sensor units 78 are at the surface or buried just below the surface in an array or grid-like pattern. The surface shown in FIG. 4 is the earth's surface and in alternative embodiments, the surface may instead be the top surface of a body of water, the bottom surface of a body of water, or a position within a body of water below the air water interface but above the bottom of the body of water. Sensor units 78 are located separately at a distance from wells 10, 11 and may be, for example, hundreds of meters from wells 10, 11 or even many kilometers away from wells 10, 11.

A conductive cable 80 connects each sensor unit 78 to a common power supply and communications module 82. Additional conductive cables 80 create a link between the power supply and communications module 82 and each well head 83. Similar to the embodiment of FIG. 1, well 10 may be cased with casing 12 which extends to the bottom of well 10. Well 11 may also be cased with casing 12, which does not extend to the bottom of the well. Well 11 may additionally have production tubing 16 that extends downward into a open portion 22 of the well, below the bottom of the casing 12.

From the wellhead 83, an electrical umbilical 84 extends into well 10 and well 11. Electrical umbilical 84 is attached to one or more electromagnetic source units 86. In operation for well 10, the source unit 86 may be affixed to casing 12 and therefore be permanently installed in the well when casing 12 is run into the well. For well 11, the source unit 86 may be affixed to production tubing 16 and installed when tubing 16 is run into the well. If tubing 16 is removed, the source units 86 will also be removed from the well. Otherwise, source units 86 affixed to tubing 16 remain in the well. Alternatively, for either well 10 or well 11, a source unit 86 may be lowered into the well on a wireline or other conventional means for placing downhole tools in a well. In this embodiment, the source units 86 may be retrieved or moved within the wellbore as needed for routine maintenance and repair, replacement, or the repositioning of the source units due to changing formation conditions or as otherwise required or desired.

After the source unit 86 is secured in the well, source unit 86 generates an electromagnetic field that permeates the ground, including the areas in the vicinity of the reservoir such as the areas above, below, and within the reservoir, and reaches the sensor units 78. Source unit 86 may generate an electromagnetic field with broadband frequencies. The change in resistivity induced by water-oil substitution, such as that due to the water flooding process produces, causes changes in the electromagnetic fields that are detectable by the sensor units 78. Measurement of the tri-axial electrical and magnetic fields can record, report and reveal these changes. Both frequency and time-domain electromagnetic measurements may be obtained. The frequencies detected by the sensor units 78 may be in the range of 0.1 to 1000 Hz. The measurements and data collected by the sensor units 78 may provide information relating to the subsurface area at a significant distance from sensor units 78, such as several hundred meters up to a number of kilometers away.

From this information, a three dimensional model of the reservoir, including the water saturation, may be generated. This model may be three dimensional and can be further refined by considering the electrical anisotropy of the overburden, the overburden being the material that lies between the formation and the earth's surface.

Modeling studies have been completed to confirm the capabilities of such a system. A reservoir model resembling a section of the Uthmaniyah section of the Ghawar reservoir in Saudi Arabia was generated using a configuration of a surface source and a series of receivers in the borehole. Results obtained from this three dimensional modeling exercise confirm that the change in resistivity induced by water-oil substitution, such as during the water flooding process, produces detectable changes in the electromagnetic fields.

Table 1 provides the characteristics of the Uthmaniyah section of the Ghawar reservoir so that the comparison of the expected relative changes of geophysical parameters relative to a baseline of 5% Sw water saturation could be obtained.

TABLE 1

Comparison of the relative variation of geophysical parameters for different amounts of water saturation Sw.
Values are normalized relative to a reference Sw = 5%.

| Sw % | Density % variation | P-velocity % variation | Resistivity % variation |
|---|---|---|---|
| 100% | 3.1 | 3.3 | 99.2 |
| 75% | 2.3 | 1.0 | 98.6 |
| 50% | 1.5 | 0.2 | 97.5 |
| 25% | 0.7 | 0.0 | 92.4 |
| 10% | 0.2 | 0.0 | 67.0 |

The full three dimensional electromagnetic field was modeled in the time domain. As expected, the resistivity parameter shows the largest relative variation when compared to density and seismic primary wave velocity. The amount of change in the resistivity is big enough that the electromagnetic field changes will be detected by the instrumentation. Electromagnetic techniques can therefore be used as an indicator of the presence of water in the reservoir.

Based on this study and further analysis, for this particular example, it was determined that the system should be capable of detecting an electronic field of a very small magnitude, such as 100 nV/m with a measurement frequency range of 0.1 Hz to 1 kHz for a duration of 0.01 to 1 second. The system should be capable of gathering up to 100 stacked measurements. The system should also be capable of operating in a well with internal diameter of 15 cm with a range of fluids including crude oil, mud and brine.

Measuring an electric field of 100 nV/m across a distance of 15 cm requires detecting a voltage difference of 15 nV. In the model, the voltage noise was projected and converted back to electromagnetic field. To measure a signal of 0.1 Hz requires a measurement of at least 10 seconds long For simplicity, it was assumed that to record the lowest frequency signals (0.1 Hz) 10 measurements (stacks) of 10 seconds duration were used. For medium frequencies (10 Hz) 30 measurements (stacks) of 0.3 second duration were used. To record the highest frequency (1 kHz) 100 measurements (stacks) of 0.01 second duration were used. These numbers are for illustration only and result in total measurement times of 100 second, 10 seconds and 1 second respectively.

Based on the foregoing sensor mechanical specifications, the smallest detectable electromagnetic field (a measurement signal to noise ratio=1) at each signal frequency is listed in Table 2 for the cases of oil and a brine plus mud mixture. If more sensitivity is desired for recording a 1 kHz signal collecting 1000 stacks would require a total of 10 seconds and give a smallest detectable E-field of 25 nV/m.

TABLE 2

Projected Smallest Detectable Electric Field for Different Signal Frequencies for a System Operating at 100° C.

| Signal frequency | Total measurement time | Smallest detectable E-field (in oil) | Smallest detectable E-field (in brine and mud mixture) |
| --- | --- | --- | --- |
| 0.1 Hz | 100 seconds | 315 nV/m | 135 nV/m |
| 0.3 Hz | 100 seconds | 100 nV/m | 50 nV/m |
| 10 Hz | 10 seconds | 60 nV/m | 15 nV/m |
| 1 kHz | 1 second | 65 nV/m | 65 nV/m |

Initial results therefore show that it is feasible to build a fully capacitive (i.e. zero resistive contact) electromagnetic field sensor that meets the measurement requirements for operating in the test field in a pure oil or brine/mud environment from 1 kHz down to 0.3 Hz, and which operates at 0.1 Hz with slightly reduced sensitivity.

Although the present invention has been described in detail, it should be understood that various changes, substitutions, and alterations can be made hereupon without departing from the principle and scope of the invention. Accordingly, the scope of the present invention should be determined by the following claims and their appropriate legal equivalents.

The singular forms "a", "an" and "the" include plural referents, unless the context clearly dictates otherwise. Optional or optionally means that the subsequently described event or circumstances may or may not occur. The description includes instances where the event or circumstance occurs and instances where it does not occur. Ranges may be expressed herein as from about one particular value, and/or to about another particular value. When such a range is expressed, it is to be understood that another embodiment is from the one particular value and/or to the other particular value, along with all combinations within said range.

Throughout this application, where patents or publications are referenced, the disclosures of these references in their entireties are intended to be incorporated by reference into this application, in order to more fully describe the state of the art to which the invention pertains, except when these reference contradict the statements made herein.

What is claimed is:

1. A method for collecting reservoir data comprising the steps of:
    (a) providing an at least one electromagnetic sensor equipped with capacitive electrodes within a subterranean well, the at least one electromagnetic sensor comprising at least one tri-axial capacitive electrode sensor;
    (b) positioning an at least one electromagnetic field source separately from the at least one electromagnetic sensor;
    (c) generating an electromagnetic field in the reservoir with the at least one electromagnetic field source, the electromagnetic field comprising tri-axial electric and magnetic fields;
    (d) measuring the electromagnetic field in a plurality of dimensions with the at least one electromagnetic sensor to collect measured data; and
    (e) generating a model of the reservoir with the measured data.

2. The method of claim 1, wherein step (d) further comprises measuring the electromagnetic field in three dimensions, and wherein step (e) further comprises generating a three dimensional model.

3. The method of claim 1, wherein the at least one tri-axial capacitive electrode sensor is sized to fit within a borehole of the subterranean well receiving a well casing, and wherein step (a) further comprises connecting the at least one tri-axial capacitive electrode sensor to the well casing in the subterranean well.

4. The method of claim 1, wherein step (a) further comprises connecting the at least one tri-axial capacitive electrode sensor to a production tubing in the subterranean well.

5. The method of claim 1, wherein the at least one tri-axial capacitive electrode sensor is sized to fit within an interior surface of a borehole of the subterranean well, and wherein step (a) further comprises connecting the at least one tri-axial capacitive electrode sensor to the interior surface of the borehole of the subterranean well.

6. The method of claim 1, wherein step (a) further comprises positioning the at least one tri-axial capacitive electrode sensor at a fixed location in the subterranean well with a wireline.

7. The method of claim 6,
    wherein the at least one tri-axial capacitive electrode sensor comprises a low-frequency tri-axial capacitive electrode sensor, and wherein the at least one electromagnetic sensor is configured to collect data in three dimensions for frequencies in the range of 0.1 Hz to 1000 Hz;
    wherein step (d) comprises measuring and reporting electric field strength in three dimensions through employment of the low-frequency tri-axial capacitive electrode sensor, the magnetic field strength in three dimensions, and change in magnetic field strength in three dimensions over time; and
    wherein the method further comprises removing the at least one tri-axial capacitive electrode sensor with the wireline.

8. The method of claim 1, wherein step (a) further comprises positioning the at least one tri-axial capacitive electrode, sensor in the subterranean well with a tubing string.

9. The method of claim 1, wherein step (a) further comprises positioning the at least one tri-axial capacitive electrode sensor in a borehole of the subterranean well, the at least one tri-axial capacitive electrode sensor fixedly located adjacent an interior surface of the borehole thereof, free from contact with the interior surface of the borehole of the subterranean well.

10. The method of claim 1, wherein step (b) comprises positioning the electromagnetic field source at a surface.

11. The method of claim 1, wherein step (b) comprises positioning the electromagnetic field source in a second well.

12. The method of claim 1, wherein step (a) further comprises positioning the at least one tri-axial capacitive electrode sensor within a borehole of the subterranean well.

13. The method of claim 1, wherein step (a) further comprises positioning the at least one tri-axial capacitive electrode sensor within a borehole of the subterranean well and step (b) comprises positioning the at least one electromagnetic field source in the subterranean well.

14. The method of claim 1, wherein step (b) further comprises positioning the at least one electromagnetic field source at a distance of at least 1 meter from the at least one tri-axial capacitive electrode sensor.

15. The method of claim 1, wherein the at least one electromagnetic field source operates at a frequency from the range of 0.1 Hz to 1000 Hz, and wherein the at least one tri-axial capacitive electrode sensor comprises a low-frequency tri-axial capacitive electrode sensor, and wherein the at least one electromagnetic sensor is configured to collect data in three dimensions for frequencies in the range of 0.1 Hz to 1000 Hz.

16. The method of claim 1, wherein the reservoir is selected from the group consisting of an oil reservoir, a gas reservoir and a water reservoir.

17. The method of claim 1, wherein the at least one electromagnetic sensor is capable of collecting both frequency and time-domain electromagnetic field data.

18. A method for collecting oil reservoir data comprising:
(a) positioning at least one electromagnetic field source at a location separate from at least one electromagnetic sensor;
(b) generating an electromagnetic field in the vicinity of the reservoir by the at least one electromagnetic field source, the electromagnetic field comprising tri-axial electric and magnetic fields;
(c) positioning the at least one electromagnetic sensor at a fixed location in a subterranean well, the at least one electromagnetic sensor comprising a tri-axial capacitive electrode sensor configured to measure the tri-axial electric field in a plurality of dimensions; and
(d) measuring and reporting electric field strength in the plurality of dimensions through employment of the tri-axial capacitive electrode sensor, and changes in the magnetic field in the plurality of dimensions over time.

19. The method of claim 18, wherein step (a) comprises positioning the tri-axial capacitive electrode sensor adjacent an inner surface of a borehole of the subterranean well, free from contact with the interior surface of the borehole of the subterranean well.

20. The method of claim 18, wherein the at least one electromagnetic sensor is capable of collecting data in three dimensions.

21. The method of claim 18, wherein the at least one electromagnetic sensor further comprises at least one magnetic field sensor, and wherein the at least one electromagnetic sensor is configured to collect data in three dimensions for frequencies in a range of 0.1 Hz to 1000 Hz.

22. The method of claim 18, wherein the at least one electromagnetic sensor is capable of collecting both frequency and time-domain electromagnetic field data.

23. An apparatus for collecting reservoir data comprising:
an at least one electromagnetic source for generating an electromagnetic field in the reservoir, the electromagnetic field comprising tri-axial electric and magnetic fields; and
an at least one electromagnetic sensor comprising at least one tri-axial capacitive electrode sensor including capacitive electrodes, located within a subterranean well, and configured to measure the electric field in a plurality of dimensions; wherein
the at least one electromagnetic source is located separately from the at least one electromagnetic sensor.

24. The apparatus of claim 23, wherein the at least one tri-axial capacitive electrode sensor is fixedly located within a borehole of the subterranean well.

25. The apparatus of claim 24, wherein the at least one tri-axial capacitive electrode sensor is located adjacent an interior surface of the borehole of the subterranean well, free from contact with the interior surface of the borehole of the subterranean well.

26. The apparatus of claim 24, wherein the at least one electromagnetic source is located at a surface.

27. The apparatus of claim 26, wherein the surface is selected from the group consisting of the earth's surface, the top surface of a body of water, the bottom surface of a body of water, and a location within a body of water below the air-water interface.

28. The apparatus of claim 24, wherein the at least one electromagnetic source is located within a second subterranean well.

29. The apparatus of claim 24, wherein the at least one electromagnetic source is located within the subterranean well.

30. The apparatus of claim 23, wherein the at least one electromagnetic source is located at a distance of at least 1 meter from the at least one tri-axial capacitive electrode sensor.

31. The apparatus of claim 23,
wherein the at least one tri-axial capacitive electrode sensor is located within a borehole of the subterranean well; and
wherein the apparatus is configured to collect electric field strength in three dimensions through employment of the tri-axial capacitive electrode sensor, the magnetic field strength in three dimensions, and a change in magnetic field strength in three dimensions, over time.

32. The apparatus of claim 23, wherein the at least one tri-axial capacitive electrode sensor comprises a plurality of tri-axial capacitive electrode sensors.

33. The apparatus of claim 23, wherein the at least one electromagnetic sensor is capable of collecting electric field data in three dimensions.

34. The apparatus of claim 23, wherein the at least one electromagnetic sensor is affixed to well casing.

35. The apparatus of claim 23, wherein the at least one electromagnetic sensor is affixed to production tubing.

36. The apparatus of claim 23, wherein the at least one electromagnetic sensor is affixed to an interior surface of the well.

37. The apparatus of claim 23, further comprising a downhole tool, and wherein the downhole tool comprises the at least one electromagnetic sensor.

38. The apparatus of claim 37, wherein the downhole tool is wireline conveyed.

39. The apparatus of claim 37, wherein the downhole tool is tubing conveyed.

40. The apparatus of claim 23, further comprising a downhole tool, and wherein the downhole tool comprises the at least one electromagnetic source.

41. The apparatus of claim 23, wherein the at least one electromagnetic source operates at a frequency from a range of 0.1 Hz to 1000 Hz, wherein the at least one tri-axial capacitive electrode sensor comprises a low-frequency tri-axial capacitive electrode sensor, and wherein the at least one electromagnetic sensor is configured to collect data in three dimensions for frequencies in the range of 0.1 Hz to 1000 Hz.

42. The apparatus of claim 23, wherein the reservoir is selected from the group consisting of an oil reservoir, a gas reservoir and a water reservoir.

43. The apparatus of claim 23, wherein the at least one electromagnetic sensor is capable of collecting both frequency and time-domain electromagnetic field data.

* * * * *